United States Patent [19]

Bar et al.

[11] Patent Number: 4,777,559
[45] Date of Patent: Oct. 11, 1988

[54] ARTICLE MOUNTING AND HANDLING METHOD AND APPARATUS

[75] Inventors: Chester Bar, Chicago; Joseph P. Moninski, Jr., Northbrook, both of Ill.

[73] Assignee: S&C Electric Company, Chicago, Ill.

[21] Appl. No.: 664,186

[22] Filed: Oct. 24, 1984

[51] Int. Cl.$^4$ ............................................ H02B 1/10
[52] U.S. Cl. ............................. 361/340; 200/50 AA; 361/339
[58] Field of Search ................... 200/50 A, 50 AA; 337/210-212; 361/338-340, 342-343, 347-351, 359, 371, 375, 376

[56] References Cited

U.S. PATENT DOCUMENTS

| | | | |
|---|---|---|---|
| 1,351,043 | 9/1920 | Kries | 337/8 |
| 1,561,239 | 11/1925 | Jennings | 337/196 |
| 1,826,370 | 10/1931 | Schwarz et al. | 200/50 A |
| 2,565,314 | 9/1951 | Lewis | 361/340 |
| 3,157,827 | 11/1964 | Tjebben | 361/340 |
| 3,327,076 | 6/1967 | Lindell | 200/50 AA |
| 3,339,118 | 8/1967 | Harner et al. | 361/339 |
| 3,573,560 | 4/1971 | Rogers | 361/339 |
| 3,576,509 | 4/1971 | Bernatt | 337/8 |
| 3,748,621 | 7/1973 | Sakats | 337/173 |
| 3,790,861 | 2/1974 | Sakats | 361/339 |
| 3,991,348 | 11/1976 | Evans | 361/335 |
| 4,190,755 | 2/1980 | Rogers | 200/334 |
| 4,250,357 | 2/1981 | Hanke | 200/50 A |
| 4,463,227 | 4/1984 | Dizon et al. | 200/50 A |

FOREIGN PATENT DOCUMENTS 0020866  1/1981  European Pat. Off. ............ 361/340

Primary Examiner—A. D. Pellinen
Assistant Examiner—Gregory P. Thompson
Attorney, Agent, or Firm—James V. Lapacek

[57] ABSTRACT

An article mounting and handling arrangement is provided for use with an enclosure to allow access to and replacement of the articles in a position removed from the operating environment. The arrangement is especially adapted for fuses and other electrical devices. Accordingly, the arrangement for use with fuses provides access to the fuses in a position disconnected from an associated circuit and to provide connection of the fuses to the associated circuit in an inaccessible position. The fuse mounting and handling arrangement is mounted with respect to the enclosure for translation along a predetermined direction between a first, accessible position outside the enclosure and a second position with the fuses being within the enclosure. The fuse mounting and handling arrangement is also pivotally mounted with respect to an axis parallel to the direction of translation. The fuses are connected into the circuit through appropriate contacts by pivoting the fuse mounting and handling arrangement about the axis from the second position to a third position. In one particular application, one side of the fuses is selectively connected to respective switched contacts. In that application, an interlock arrangement is provided to prevent pivoting of the fuses between the second and third positions when the switch contacts are closed to the fuse contacts. The fuse mounting and handling arrangement also includes apparatus to prevent pivoting of the fuses when the arrangement is between the first and second positions and to prevent translation when the fuses are pivoted between the second and third positions. The arrangement also includes wall members that provide a barrier to prevent access into the enclosure when the fuses are in the first, second or third position.

35 Claims, 10 Drawing Sheets

POSITION ONE

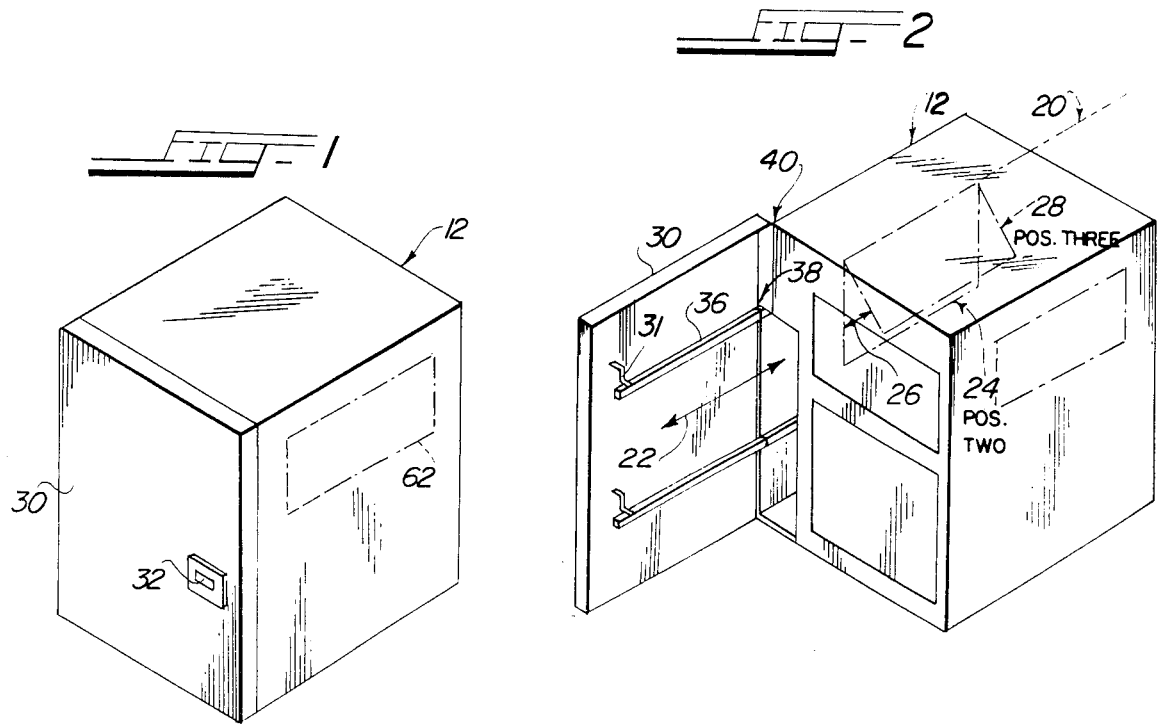
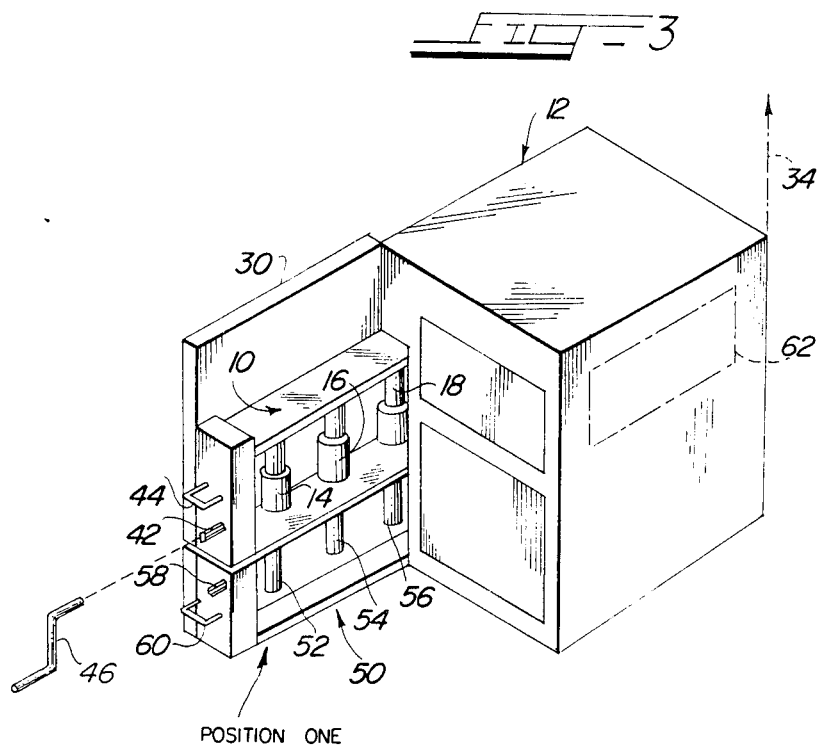

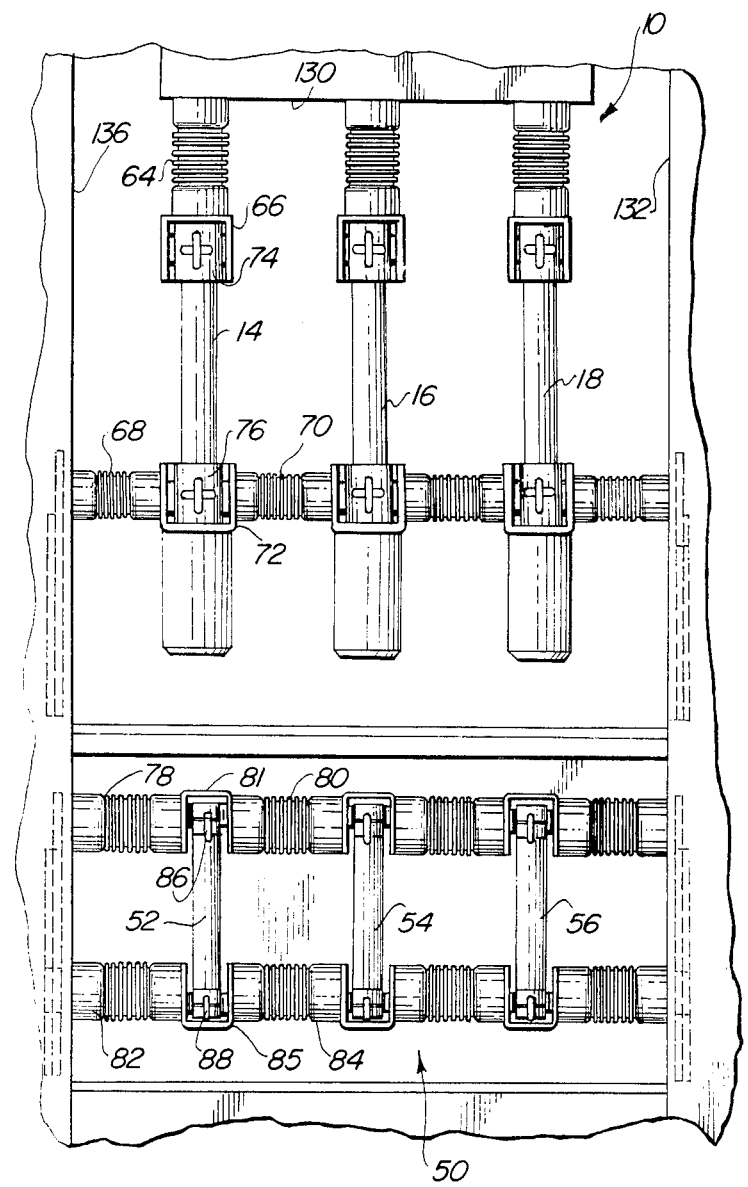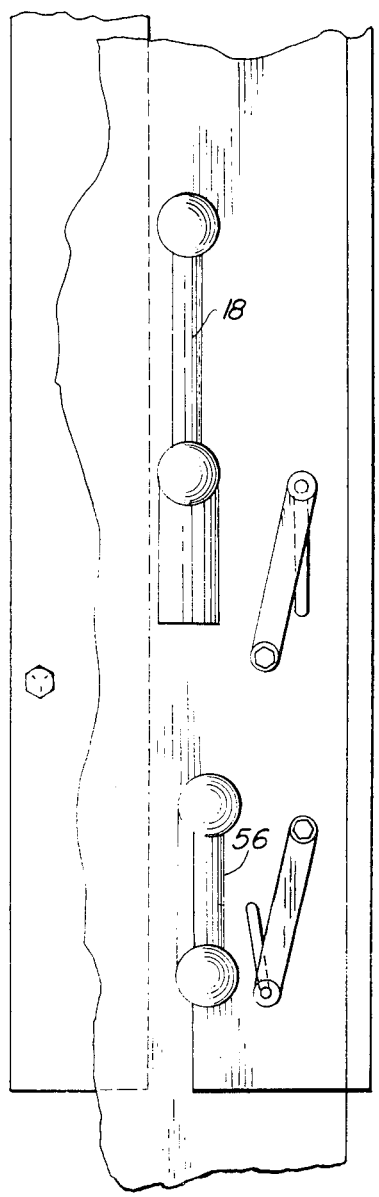

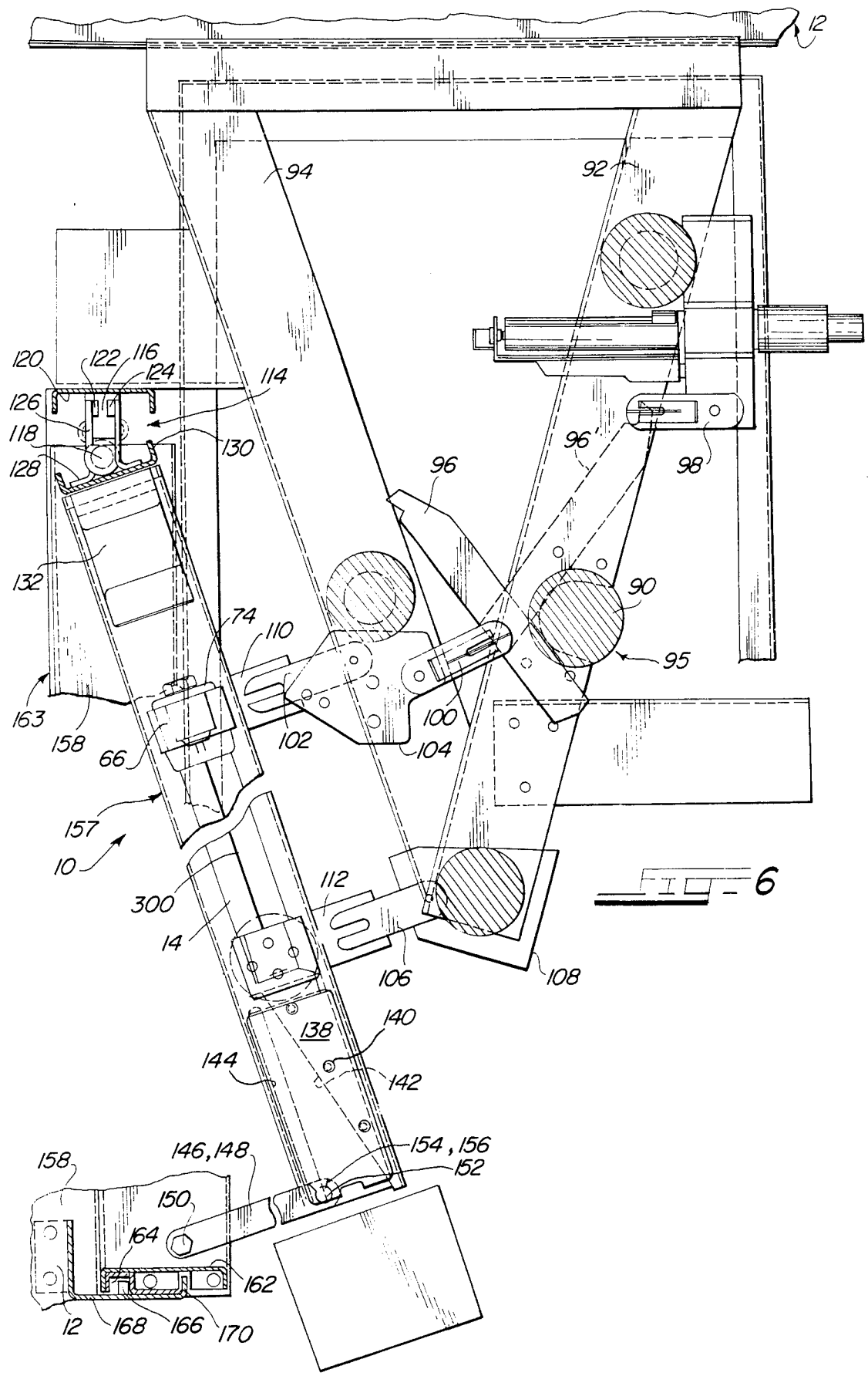

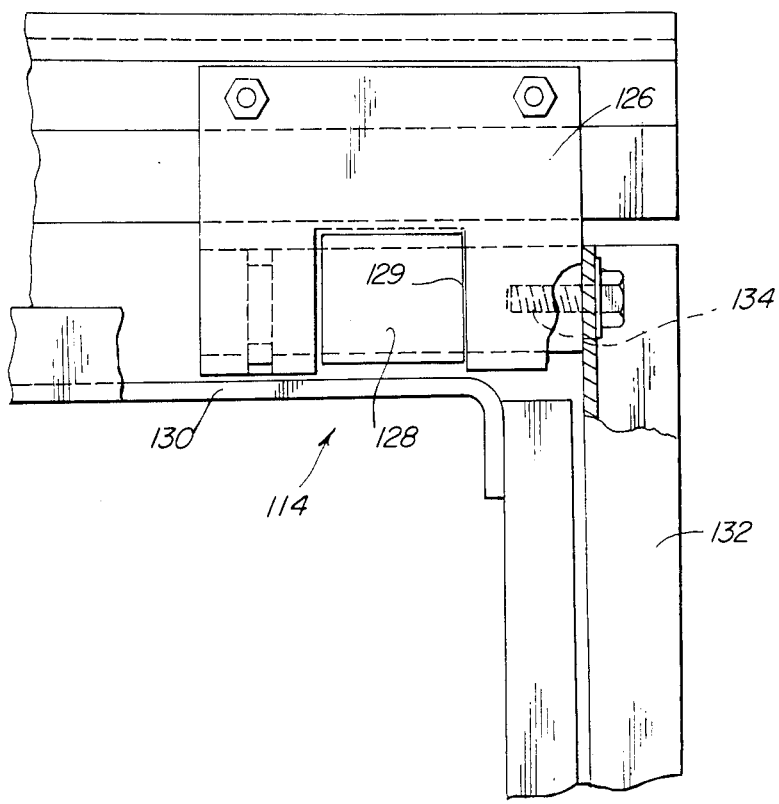
FIG_8
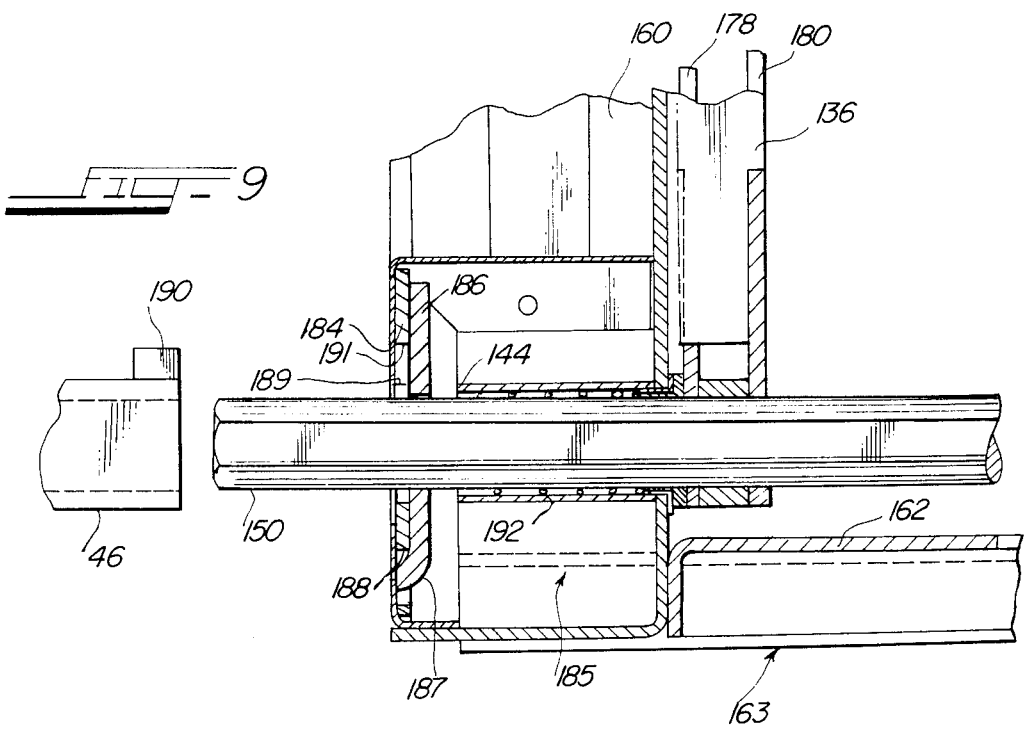
FIG_9

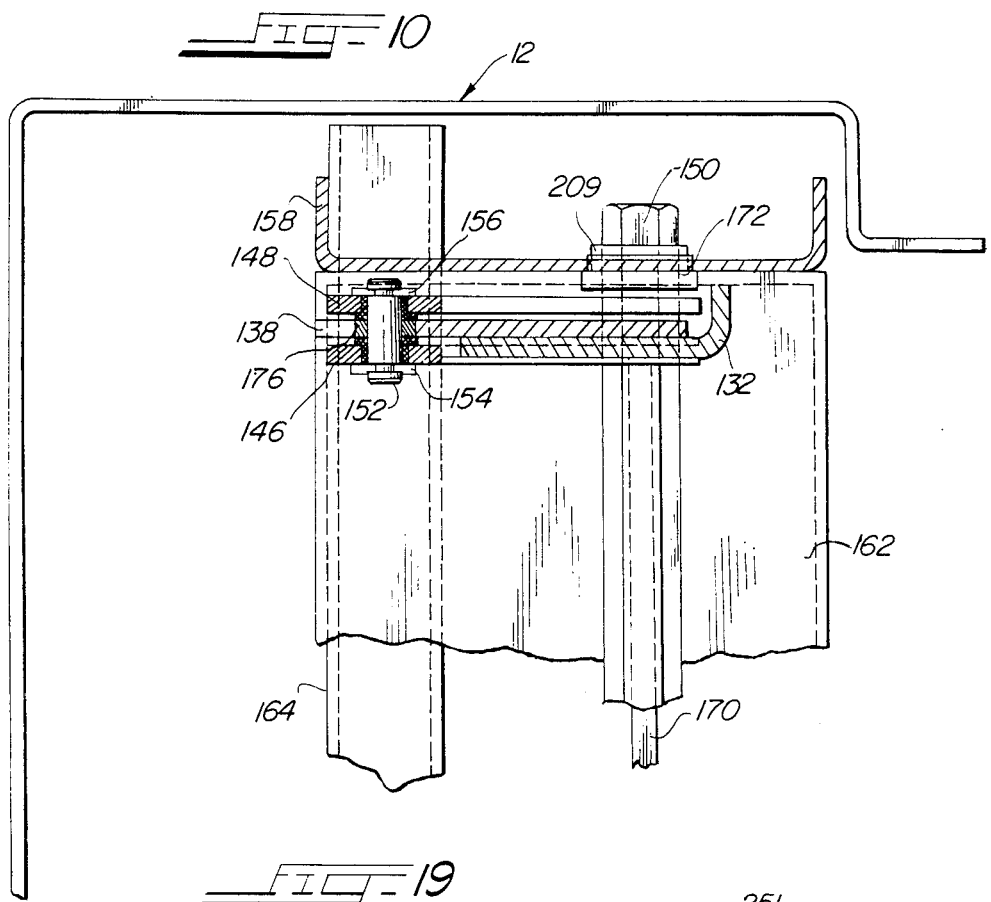
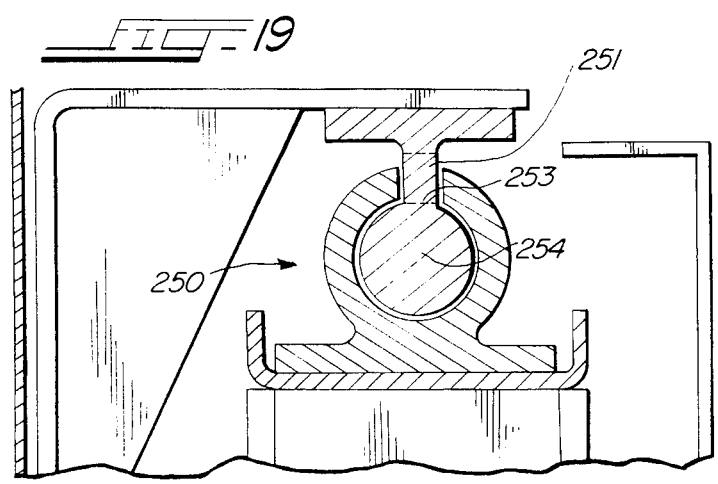

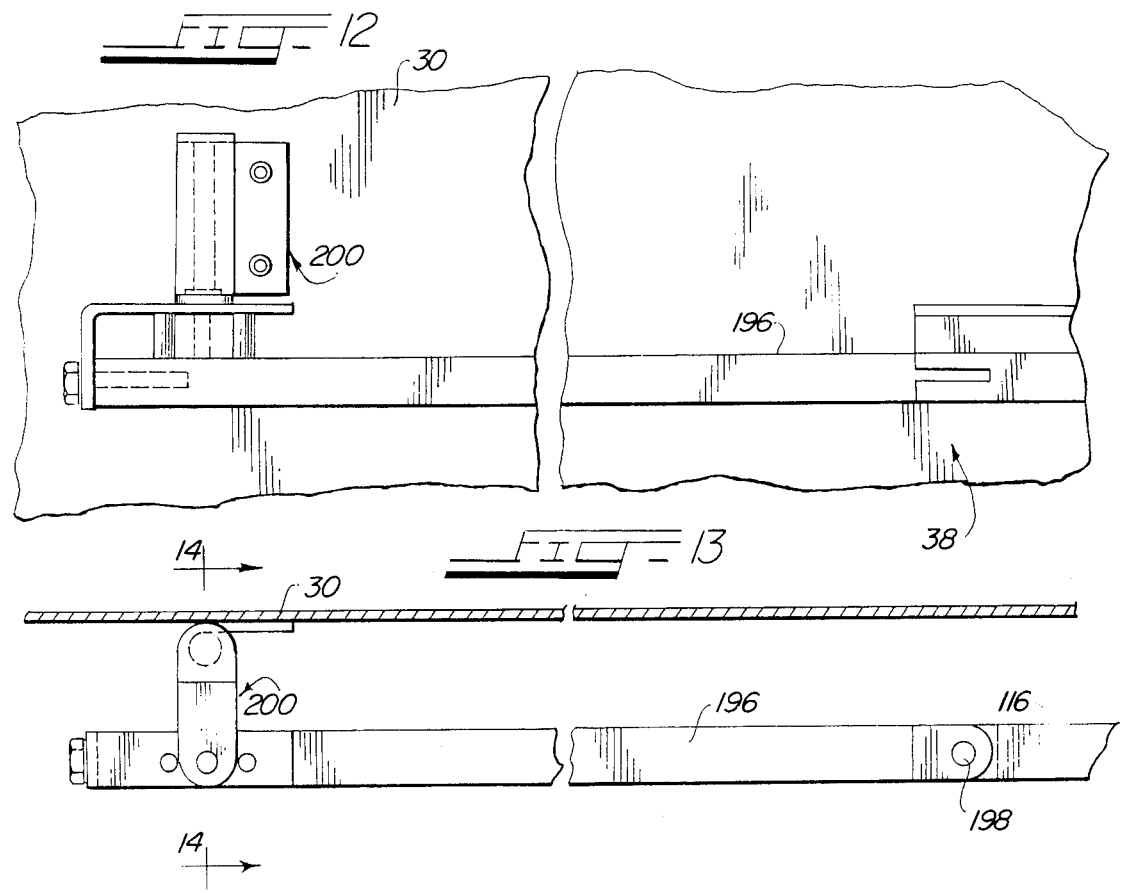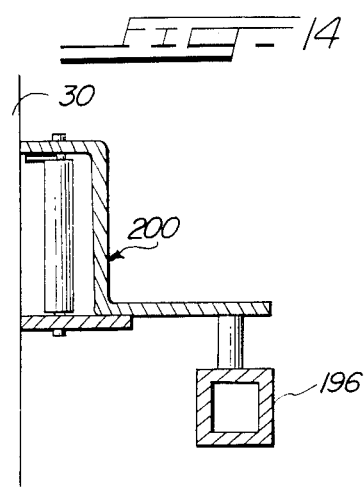

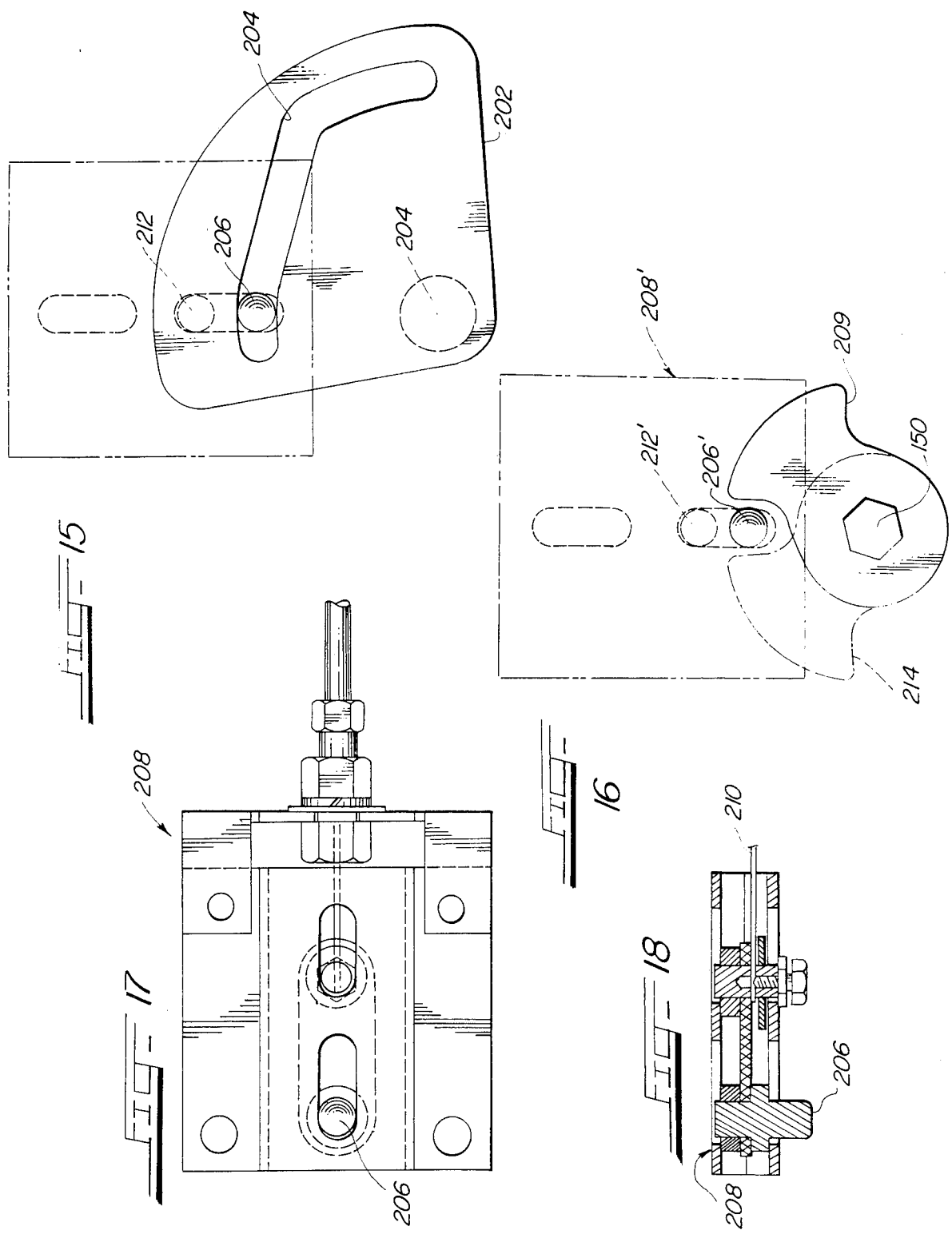

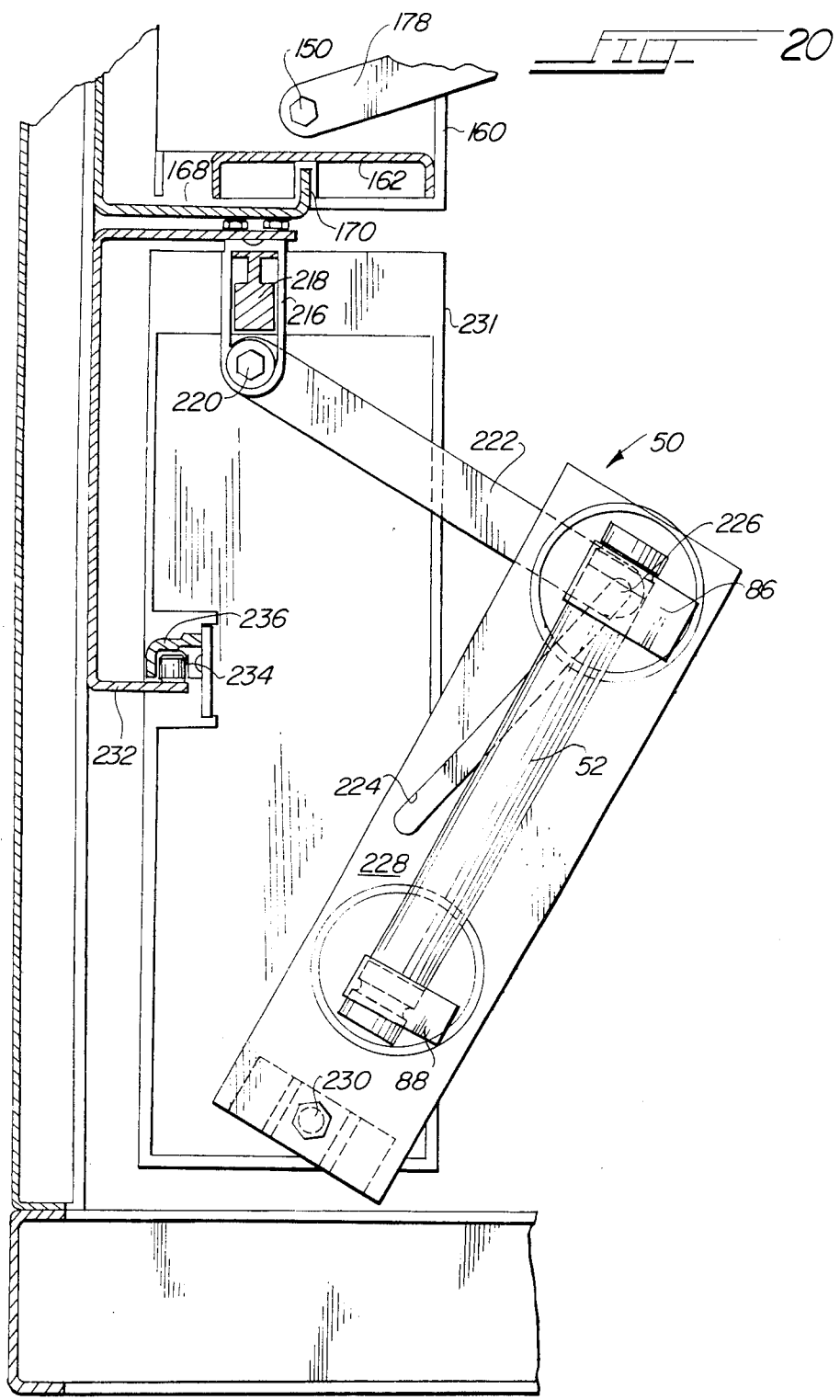

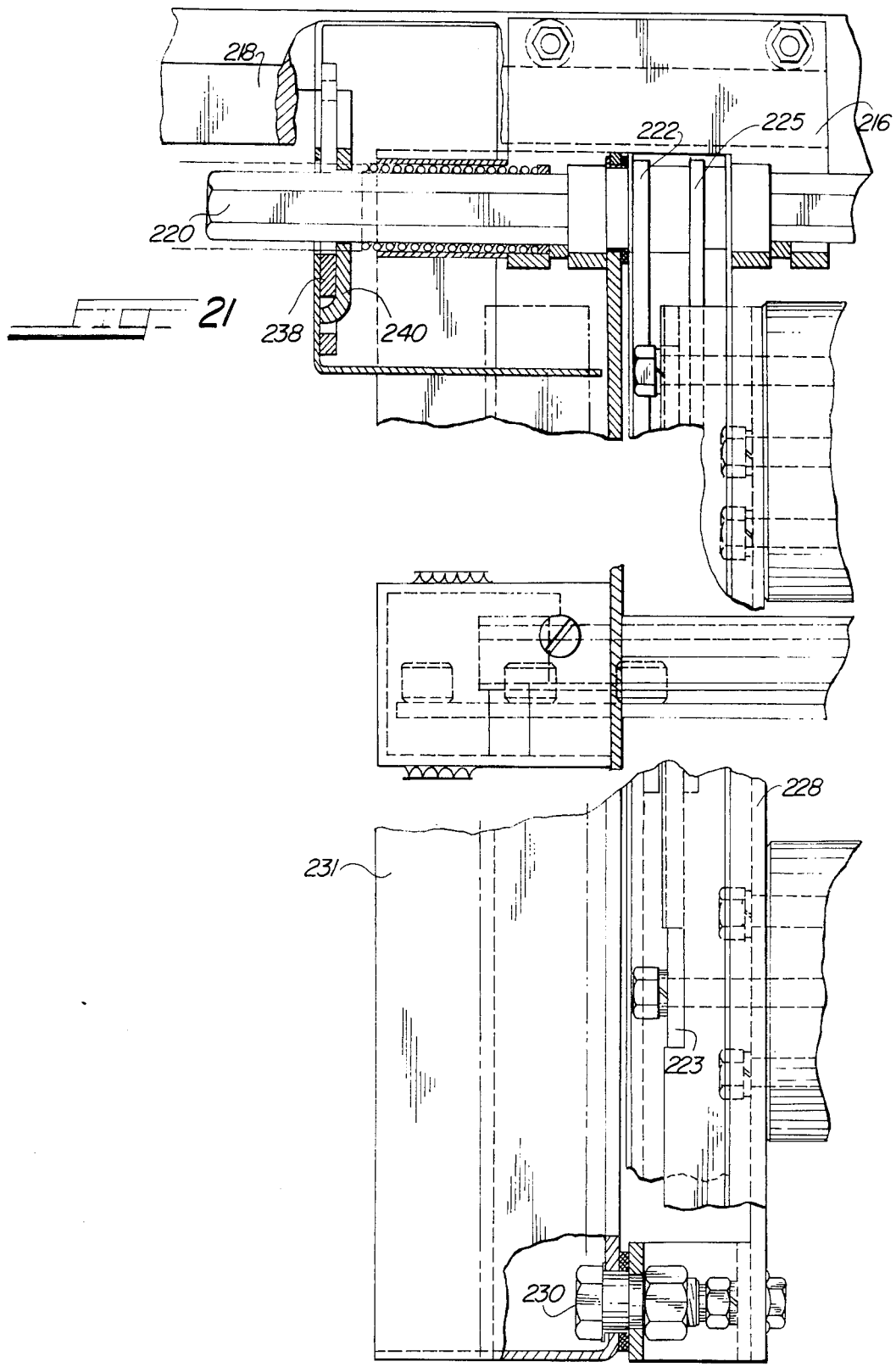

ARTICLE MOUNTING AND HANDLING METHOD AND APPARATUS

BACKGROUND OF THE INVENTION

1. Field of the Invention

The present invention relates generally to a method and apparatus for mounting one or more articles which permits movement of the one or more articles from an inaccessible location behind a wall or within an enclosure to an accessible location in front of the wall or outside the enclosure; the movement including pivoting of the one or more articles about a predetermined axis and translating movement in a direction parallel to the predetermined axis. In one application of the present invention, the present invention relates to a mounting for an electrical fuse or other electrical device which is movable on the mounting between an inaccessible position within an enclosure and an accessible position outside the enclosure. In the case of an electrical component, a fuse for example, the fuse is connected to an electrical circuit in the inaccessible position and disconnected from the electrical circuit in the accessible position.

In many work environments, various articles or devices are used in normally inaccessible locations. Such inaccessible locations may typically be behind a wall which may form a portion of some type of enclosure. Often, depending upon the work environment, it may become necessary from time to time to inspect or replace the article or device for a variety of reasons. Either because of the size or weight of the article or device, or because of the nature of the environment behind the wall or within the enclosure, it may be desirable that movement of the article or device to an accessible location be achieved indirectly by manipulation and movement of a mounting for the article or device.

Considering high-voltage electrical apparatus of the so-called pad-mounted or metal-enclosed variety as exemplary of the work environment in which the mounting of the present invention may be used, the article or device may constitute an electrical device or component such as a fuse, a switch, a transformer, a circuit breaker or a meter. In the past, typical pad-mounted and metal-enclosed gear has included a metal enclosure having one or more access doors on the exterior thereof. Opening of one or more of these doors, as well as any doors, screens or barriers therebehind, renders accessible the electrical device or component. In a variation of typical pad-mounted or metal-enclosed gear, often referred to as "grounded front" or "dead front" gear, the opening of the exterior doors does not immediately render accessible the electrical device or component within the enclosure. What is rendered immediately accessible upon opening the exterior doors are various walls, panels, and other devices, such as electrical connectors or the like, the immediately exposed surfaces of which are all at the ground potential of the enclosure. Theoretically, then, a workman in the vicinity of this variety of high-voltage gear may contact either the enclosure or any of the items exposed by opening the exterior doors without being exposed to high voltages, because, presumably, none of these items are at an elevated potential. In so-called "grounded front" gear, then, access to the electrical devices or components within the enclosure requires further manipulation which typically involves or requires de-energization of the involved device or component so that the enclosure may be penetrated and the device or component may be removed by the workman.

Especially in the field of high-voltage electrical gear, safety is of prime importance. Accordingly, also of prime importance with such high-voltage gear is the prevention of the intentional or unintentional ingress into those portions of the enclosure which contain energized live parts when the electrical device or component of interest is being removed for inspection, replacement or the like. A primary object, therefore, of the present invention, is to provide a mounting for an electrical device or component, such as a high-voltage fuse, which may be moved between an inaccessible position within the enclosure and an accessible position outside of the enclosure; the mounting and its method of operation minimizing any points of ingress into those portions of the enclosure whereat energized live parts could be intentionally or inadvertently contacted by a workman.

2. Brief Description of the Prior Art

The following United States patents disclose mounting and handing arrangements for fuses, electrical equipment and other articles: U.S. Pat. No. 4,463,227 which issued to Dizon et al, on July 31, 1984; U.S. Pat. No. 4,250,357 which issued to Hanke on Feb. 10, 1981; U.S. Pat. No. 4,190,755 which issued to Rogers on Feb. 26, 1980; U.S. Pat. No. 3,991,348 which issued to Evans on Nov. 9, 1976; U.S. Pat. No. 3,790,861 which issued to Sakats on Feb. 5, 1974; U.S. Pat. No. 3,748,261 which issued to Sakats on July 24, 1973; U.S. Pat. No. 3,576,509 which issued to Bernatt on Apr. 27, 1971; U.S. Pat. No. 3,573,560 which issued to rogers on Apr. 6, 1971; U.S. Pat. No. 3,339,118 which issued to Harner et al, on Aug. 29, 1967; U.S. Pat. No. 1,826,370 which issued to Schwartz et al, on Oct. 6, 1931; U.S. Pat. No. 2,565,314 which issued to Lewis on Aug. 21, 1951; U.S. Pat. No. 1,561,239 which issued to Jennings on Nov. 10, 1925; and U.S. Pat. No. 1,351,043 which issued to Krier on Aug. 31, 1920.

The arrangement in U.S. Pat. No. 4,463,227 is directed to a mounting for an article affixed to one surface of a panel with the panel being simultaneously moved and translated or pivoted end-for-end or side-for-side relative to an opening to selectively move the article between the two locations. The panel covers or blocks the opening in both the locations of the article.

U.S. Pat. No. 4,250,357 discloses a fuse mounting on a back side of a panel with the panel being hinged at the bottom of the enclosure wall to gain access to each fuse. The panel is unlatched and rotated outwardly and downwardly on its hinge until the fuse is accessibly located in a horizontal position immediately in front of the opening normally covered by the panel. Similarily U.S. Pat. No. 1,826,370 is also directed to an arrangement where a fuse is rotated outwardly such as with a panel drawer assembly to simultaneously rotate a plurality of fuses within a panel drawer assembly to move the fuses between accessible and inaccessible positions.

U.S. Pat. Nos. 3,790,861, 3,576,509 and 3,573,560 are directed to horizontally slidable fuse drawers or carriers.

U.S. Pat. No. 3,991,348 is directed to a tool and cooperating enclosure arrangement with insertion of the tool opening an access port, isolating the fuse and engaging the fuse so it can be removed.

U.S. Pat. No. 4,190,755 discloses a slidably mounted, switch-operating mechanism mounted on rollers which roll on tracks on upper and lower mounting brackets extending from the enclosure. The arrangement provides certain uncoupling, drawout and interlocking features.

U.S. Pat. No. 3,748,621 discloses a locking mechanism utilizing a blocking cam to prevent opening the fuse drawer if an elbow is connected.

U.S. Pat. No. 3,339,118 discloses a horizontally movable fuse drawer interlocked with an interrupter switch arrangement.

Additionally, U.S. Pat. Nos. 1,351,043, 1,561,239 and 2,565,314 relate to various arrangements where components are rotated to inaccessible positions and various blocking arrangements are provided that block resulting openings upon the articles being moved to the accessible positions.

While the above-described arrangements of the prior art are generally suitable for their intended purpose, the present invention provides a desirable novel and unobvious method and apparatus for mounting and handling a planar array of articles and including arrangements for slidably mounting the articles with respect to an enclosure for translation along a predetermined direction between a first outward accessible position for maintenance and the like and a second position with the articles being within an enclosure. The arrangement further includes pivoting of the article plane about a predetermined axis parallel to the direction of translation from the second position to a third position whereat the articles are placed within a normal operating condition. For example, the articles in one application are high-voltage fuses within a high-voltage enclosure; the fuses in the third position connected in circuit. This arrangement is especially useful in multiple bays of metal-enclosed switchgear that include three-phase power buses that run across and through multiple bays of metal-enclosed switchgear lineups; the arrangement eliminating the need for any special handling of bus connections as would be required with prior art mounting and handling arrangements for high-voltage fuses.

SUMMARY OF THE INVENTION

Accordingly, it is a principal object of the present invention to provide article handling and mounting arrangements and methods especially adapted for fuses and for use with an enclosure wherein the fuses are slidably mounted with respect to the enclosure for translation in a predetermined direction between an outward accessible position and a second position with the fuses being within the enclosure; the mounted fuses or articles then being pivoted about an axis parallel to the direction of translation from the second position to the third position whereat the articles are placed in a normal operating position, e.g. the fuses are connected in circuit.

It is another object of the present invention to provide a fuse handling and mounting arrangement that is translatable in a predetermined direction and pivotable about an axis parallel to the translation direction, the arrangement preventing translation of the articles when the articles are pivoted away from a predetermined position and also preventing pivoting of the articles when the articles are translated away from a predetermined position.

Briefly, in accordance with important aspects of the present invention there is provided an article mounting and handling arrangement for use with an enclosure to allow access to and replacement of the articles in a position removed from the operating environment. The arrangement is especially adapted for fuses and other electrical devices. Accordingly, the arrangement provides access to the fuses in a position disconnected from an associated circuit and to provide connection of the fuses to the associated circuit in an inaccessible position. The fuse mounting and handling arrangement is mounted with respect to the enclosure for translation along a predetermined direction between a first, accessible position outside the enclosure and a second position with the fuses being within the enclosure. The fuse mounting and handling arrangement is also pivotally mounted with respect to an axis parallel to the direction of translation. The fuses are connected into the circuit through appropriate contacts by pivoting the fuse mounting and handling arrangement about the axis from the second position to a third position. In one particular application, one side of the fuses is selectively connected to respective switched contacts. In that application, an interlock arrangement is provided to prevent pivoting of the fuses between the second and third positions when the switch contacts are closed. The fuse mounting and handling arrangement also includes apparatus to prevent pivoting of the fuses when the arrangement is between the first and second positions and to prevent translation when the fuses are pivoted between the second and third positions. The arrangement also includes wall members that provide a barrier to access into the enclosure when the fuses are in the first, second or third position.

BRIEF DESCRIPTION OF THE DRAWING

The invention, both as to its organization and method of operation, together with further objects and advantages thereof will be best understood by reference to the following specification taken in connection with the accompanying drawing in which:

FIGS. 1–3 are perspective views of an enclosure provided with the article mounting and handling arrangement of the present invention illustrating various features and modes of operation, the illustrated articles being fuses;

FIG. 4 is a side elevational view, with parts cut away, of the fuse mounting and handling arrangement shown in FIG. 3;

FIG. 5 is a side elevational view of the mounting and handling arrangement of FIG. 4;

FIG. 6 is a front elevational view, with parts removed, of the fuse mounting and handling arrangement of the present invention in the environment of an enclosure as in FIGS. 1–3;

FIG. 8 is a side elevational view with parts cut away of the rear section of the fuse mounting and handling arrangement;

FIG. 9 is a side elevational view, partly in section and with parts cut away for clarity, illustrating the structure for providing pivoting of the fuse mounting and handling arrangement of FIGS. 1–6;

FIG. 10 is a plan view partly in section of a portion of the rear of the fuse mounting and handling arrangement of FIGS. 1–9;

FIGS. 12 and 13 are respective side and plan elevational views, partly in section and with portions broken away, illustrating the hinged guide rail carried by the door of the enclosure for use with the present invention of FIGS. 1–11;

FIG. 14 is a front elevational view of a support arrangement for the rail of FIGS. 12 and 13;

FIGS. 15–18 are various views of an interlock arrangement that inhibits operation of the mounting and handling arrangement of the present invention when a switch is in the closed position;

FIG. 19 illustrates an alternate hinge and suspension arrangement for the mounting and handling arrangement of the present invention of FIGS. 1–18;

FIG. 20 is a front view of a second, lower fuse mounting and handling arrangement of the present invention illustrated in FIG. 3, partly in section and with parts removed and cut away for clarity; and FIG. 21 is a side view, partly in section and with parts cut away and removed for clarity, of portions of the second, lower fuse mounting and handling arrangement of the present invention.

DETAILED DESCRIPTION OF THE PREFERRED EMBODIMENT

Figure 7:
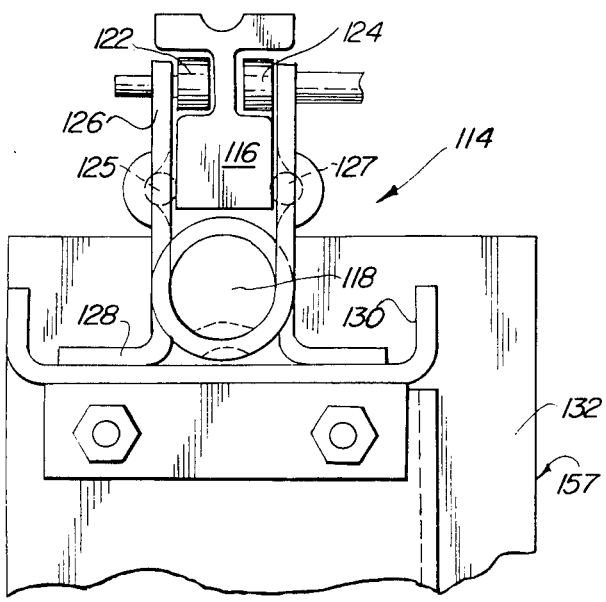
FIG. 7 is a front elevational view on an enlarged scale illustrating a carriage assembly for suspension of the fuse mounting and handling arrangement of FIG. 6.

Referring now to FIGS. 1, 2 and 3, the article mounting and handling arrangement 10 of the present invention is shown in FIG. 3 in a first, article-accessible position in which the article mounting and handling arrangement 10 is positioned external to an enclosure 12. In this position shown in FIG. 3, an array of articles, for example fuses 14, 16 and 18 or other electrical components are disconnected from an associated circuit and are accessible for inspection or maintenance or the like including removable from the article mounting and handling arrangement 10. Accordingly, fuses 14, 16 and 18 are accessible to maintenance personnel only in the first position as shown in FIG. 3 whereat the fuses are disconnected and physically separated from the associated circuit and the internal circuitry of the enclosure 12. While the preferred embodiment will be described for illustrative purposes with respect to fuses, and is referred to hereafter as a fuse mounting and handling arrangement, it should be understood that the article mounting and handling arrangement of the present invention is applicable to other articles that are desired to be transported between operation and maintenance positions.

In accordance with important aspects of the present invention and referring now specifically to FIG. 2, the fuse mounting and handling arrangement 10 is movable or translatable in the direction illustrated by arrow 22 to a second position shown in phantom at 24. In the second postion at 24, the fuse mounting and handling arrangement 10 is positioned totally within the enclosure 12. From the second position at 24, the fuse mounting and handling arrangement 10 is pivoted about an axis 20 in a direction at 26 to a position shown in phantom at 28. In the third position illustrated at 28, the fuses 14, 16 and 18 are connected in an associated circuit provided within the enclosure 12; the fuses 14, 16 and 18, as well as the inner portions of enclosure 12, being rendered inaccessible in the third position. The enclosure 12 includes an access door 30 illustrated in the open position in FIGS. 2 and 3 and in the closed position in FIG. 1. The door 30 is provided with a suitable access controlling arrangement 32 that either accepts a padlock or is operable, for example, by special interfitting tools. The normal operating condition of the fuse mounting and handling arrangement 10 is as shown in FIG. 1 with the access door 30 in the closed, secured position and the fuse mounting and handling arrangement 10 in the third, circuit-connected position at 28.

When fuse maintenance or inspection is desired, the access door 30 is opened to the position in FIG. 2, the fuse mounting and handling arrangement 10 is pivoted back to the substantially vertical, second position at 24, and then the fuse mounting and handling arrangement is translated in the direction of arrow 22 to withdraw the fuse mounting and handling arrangement 10 to the external, accessible position shown in FIG. 3. The enclosure 12 in particular examples is of the general type known to those skilled in the art as pad-mounted or metal-enclosed, high-voltage electrical apparatus. In the arrangement of FIGS. 1–3, the fuse mounting and handling arrangement 10 in the first and second positions maintains the array of fuses 14, 16 and 18 in a substantially vertical position with respect to a vertical axis 34. In the third position at 28 of FIG. 2, the fuse mounting and handling arrangement 10 and the planar assay of fuses 14, 16 and 18 is pivoted or rotated to form an angle with respect to the vertical axis 34.

The fuse mounting and handling arrangement 10 is suspended for translating motion from and along a rail 36 that is supported along the enclosure 12 and by the door 30 at 31. The rail 36 is articulated at 38 to allow pivoting of the door 30 between the open and closed positions about a hinge or pivot axis 40. In an alternative embodiment, the rail is selectively attachable at 38 and at 31; the portion of the rail adjacent the door 30 being removed when the door 30 is closed. In another alternative embodiment, the rail is hinged at 38 to fold downward for storage. The fuse mounting and handling arrangement 10 is suspended from the rail 36, as explained in more detail hereinafter, so as to allow pivoting of the arrangement 10 about the axis 20. In one specific embodiment (refer to FIG. 3), the fuse mounting and handling arrangement 10 is pivoted by rotation of a shaft 42 through use of a tool 46. Also in a specific embodiment, a handle 44 is provided on an end panel of the fuse mounting and handling arrangement 10 for grasping by maintenance personnel to effect translation of the arrangement 10 in the direction 22.

Referring again now to FIG. 3, a second fuse mounting and handling arrangement, referred to generally at 50, is disposed below the upper fuse mounting and handling arrangement 10. The second fuse mounting and handling arrangement 50 mounts and carries an array of fuses such as 52, 54 and 56. In the preferred arrangement of the present invention wherein two fuse handling arrangements 10 and 50 are provided, the arrangements 10 and 50 are separably operable as to their first, second and third positions. In alternate embodiments, the arrangements 10 and 50 are either permanently or selectively attachable one to the other so as to move as a combined fuse mounting and handling arrangement. In the preferred embodiment where the fuse mounting and handling arrangement 50 is separate from the arrangement 10, a grasping handle 60 and rotatable shaft 58 are provided. The rectangular dashed portion 62 represents an opening in the right side wall of the enclosure 12 that is provided for the straight-through routing of three-phase bus interconnection and the like where multiple enclosures or bays are placed side-by-side.

Referring now additionally to FIGS. 4 and 5, the fuse handling arrangement 10 and 50 are shown with their respective mounting arrangements in more detail. For example, an insulator 64 extending downward from the top of the arrangement 10 carries an upper fuse-mounting clip 66. Horizontally arranged insulators, for example 68 and 70, are provided between the sidewalls of the arrangement 10 to support a lower fuse-mounting clip 72. The upper mounting clip 66 and the lower mounting clip 72 are arranged to mechanically connect and thereafter retain the respective upper and lower contact ferrules 74 and 76 of the fuse 14. In specific embodiments, the mounting clips 66 and 72 are conductive. However, the practice of the present invention in the preferred embodiment does not require electrical connection of the fuse ferrules to the clips. In an alternate embodiment, the fuse mounting and handling arrangement includes connection arrangements similar to those described hereinafter for electrically and mechanically connecting the fuses to an associated circuit. Similarly, the lower fuse mounting and handling arrangement 50 includes horizontally arranged insulators such as insulators 78 and 80 carrying upper fuse-mounting clip 81 and includes insulators 82 and 84 for carrying lower fuse-mounting clip 85. The mounting clips 81 and 85 are arranged to mechanically connect and retain the respective upper and lower fuse contact ferrules 86 and 88. The mounting clips 66, 72, 81 and 88, for example, are secured to their respective insulators by suitable fasteners. In a specific embodiment, the mounting clips 66, 72, 81 and 88 retain the respective fuses by means of spring tension obtained by an interference fit between the inserted fuse and the mounting clips. Further, the fuses are removed either by a tool that spreads the mounting clip or by a pulling force exerted on the fuse.

Referring now to FIG. 6, the fuse mounting arrangement 10 is shown with the fuses pivoted to the third position within the enclosure 12. In the arrangement shown in FIG. 6, a rotary switch actuator 90 of a switching arrangement or switch 95 is rotatably mounted with respect to support beams 92 and 94 that extend from the enclosure 12. The rotary switch actuator 90 carries a conductive switch blade 96 shown in the open position in FIG. 6. the switch blade is shown in phantom at 96' in the closedcircuit position. In the closed position, the switch blade 96 provides electrical connection between a circuit contact clip 98 and a lower circuit contact clip 100. In the open position of the switch actuator 90, the contact blade 96 moves to the open position shown in FIG. 6 and opens the electrical path between the contact clips 98 and 100. The lower clip 100 is connected to a contact clip 102 via a conductive plate 104 with both contact clips 100 and 102 being suitably fastened to the plate 104. A lower contact clip 106 is suitably fastened to a conductive plate 108.

Considering an illustrative example which should not be interpreted in any limiting sense, the contact clip 98 represents an input connection to a power bus or the like on one line of a three-phase power line connection and the lower contact clip 106 and plate 108 represent a fused, circuit output for load or distribution connection points for the respective line of a three-phase power line connection. While the switching arrangement 95 is illustrated as being within the enclosure, it should be understood that the practice of the present invention also includes a remotely-located switch.

Each of the fuses such as 14, for example, includes a conductive extending contact tongue 110 extending from the upper contact ferrule 74 and a lower extending contact tongue 112 extending from the lower contact ferrule 76. With the fuses such as 14 pivoted to the third position as shown in FIG. 6, the contact tongues 110 and 112 respectively engage the contact clips 102 and 106. Accordingly with the switch 90 in the closed position, the fuse 14 is connected in series between the input connection at 98 and the output connection at 108. Conversely with the fuses such as 14 of the fuse mounting and handling arrangement 10 pivoted back to the substantially vertical, second position, the contact tongues 110 and 112 disengage the respective contact clips 102 and 106 and thus the fuse 14 is disconnected from all circuit connections.

As will be explained in more detail hereinafter, the fuse mounting and handling arrangement 10 includes arrangements for preventing pivoting of the fuses either form the substantially vertical second position to the third, circuit-connection position or vice versa with the switch blade 96 in the closed circuit position thereby ensuring against any arcing. The switch 95 includes provisions to avoid arcing during opening or closing. As will be apparent to those skilled in the art, for three-phase power line connection, the switching arrangement 95 includes a switch blade such as 96 and corresponding contact arrangements 100, 102, 104, 106 and 108 for each phase to provide simultaneous connection and disconnection of the fuses 14, 16 and 18. Concerning the alternate embodiment where the fuse mounting and handling arrangement 10 electrically connects the fuses, each mounting clip such as 66 includes a contact tongue 110 or similar connector.

The fuse mounting and handling arrangement 10 includes two or more carriage assemblies 114 that provide translation of the fuse mounting and handling arrangement 10 along a rail 116 and pivotal movement of the arrangement 10 about the axis of a hinge shaft 118. The rail 116 in a specific embodiment includes a T-shaped cross section and is mounted extending downwardly from a support channel 120 of the enclosure 12. The carriage assembly or suspension means 114 in a specific embodiment includes rotatably mounted rollers 122, 124. The carriage assembly 114 is shown in more detail in FIGS. 7 and 8. Referring now to FIGS. 7 and 8, the carriage assembly 114 includes a U-shaped member 126 for supporting the hinge shaft 118 and for mounting the rollers 122, 124. The carriage 114 also includes guide bearing members 125, 127 disposed with races in the walls of member 126. A U-shaped support member 128 interfits with the member 126 in relative inverted fashion through a central opening 129 of the member 126. The member 128 is supported about the shaft 118 and is secured by welding or fasteners to an upper channel member 130 of the fuse mounting and handling arrangement 10.

Assuming that the carriage assembly 114 in FIGS. 7 and 8 illustrates the rear-most mounted carriage, a rear channel member 132 is secured to the shaft 118 by a fastener 134. Similarly the front carriage assembly such as 114 is attached to the upper channel member 130 and a front channel member 136 (see FIGS. 4 and 9) that is similar to the rear channel member 132. Thus, referring to FIG. 4, the respective insulators such as 64, 68 and 70 mount the fuses 14, 16 and 18 with respect to the upper channel member 130, the rear channel member 132 and the front channel member 136. Referring again additionally to FIG. 6, the rear channel member 132 at the lower end thereof carries a guide plate 138 that is secured to the channel member 132 by fasteners 140 or the like. The trailing edge 142 of the rear channel member 132 is tapered to allow the guide plate 138 to extend past the tapered edge 142. The guide plate 138 includes an elongated guide slot 144. Two drive levers 146, 148 (148 is hidden behind 146) at one end are each fixedly mounted to a shaft 150 so as to rotate with the shaft 150 (corresponding to drive shaft 42 of FIG. 3). The opposite ends of the drive levers 146, 148 include apertures for receiving a pin 152 through the guide slot 144 with the guide plate 138 positioned between the levers 146, 148. Two retaining clips 154 and 156 are mounted on the ends of the pin 152 (156 is hidden behind 154 in FIG. 6).

Figure 11:
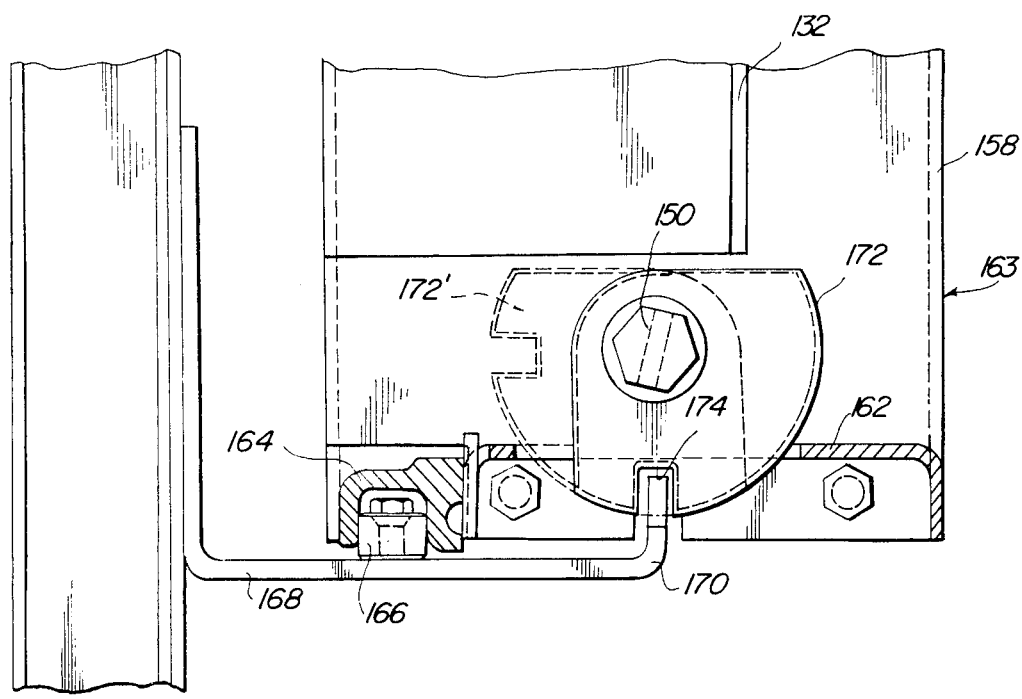
FIG. 11 is a front elevational view, partly in section and with parts cut away, illustrating the details of an interlock cam and cooperating portions of the present invention of FIGS. 1–10.

Accordingly, as the shaft 150 is rotated in a clockwise direction as shown in FIG. 6, the drive levers 146, 148 move from the top portion of the slot 144 to the bottom portion of the slot 144 with the pin 152 applying force to the guide plate 138 so as to pivot the fuses 14, 16 and 18 to the third connected position as shown in FIG. 6. Accordingly, the upper channel member 130, the rear channel member 132 and the front channel member 136 form an inner frame 157 of the arrangement 10 that pivots by means of rotation of the shaft 118 and the member 126. One end of the rotatable shaft 150 is rotatably mounted in a rear cover 158. Referring additionally to FIG. 9, the front channel member 136 carries drive levers 178, 180 fixed to the shaft 150 in similar arrangement and operation as discussed hereinbefore such that the front channel 136 is pivoted by rotation of the shaft 150. The shaft 150 is rotatably mounted in a front cover 160. The front and rear covers 160, 158 of the arrangement 10 and a bottom channel member 162 fixed between the covers 158, 160 comprise an outer frame 163. Accordingly, the outer frame 163 moves from the first position to the second position and along a direction parallel to the rail 116 along with the inner frame 157. With the arrangement 10 in the second, substantially vertical position within the enclosure 12, rotation of the shaft 150 results in pivoting of the inner mounting frame 157 along with the carried fuses 14, 16 and 18 to the pivoted position shown in FIG. 6. Referring additionally to FIGS. 10 and 11, the bottom frame channel member 162 includes a guide channel 164 which cooperates with a plurality of guide rollers 166 carried by a support member 168 of the enclosure 12. A support member 168 of the enclosure 12 also includes an upstanding guide wall 170 that cooperates with an interlock cam 172 as seen in FIG. 11.

Referring now to FIGS. 9, 10 and 11 and initially to FIG. 11, an interlock cam 172 is fixedly carried by the rotatable shaft 150. The interlock cam 172 includes a cam slot 174 that is arranged to be aligned for non-interference of the cam 172 with the guide wall 170 when the arrangement 10 and fuses 14, 16 and 18 are positioned substantially vertically e.g., in the first and second positions and translating positions therebetween. Accordingly, with the fuses 14, 16 and 18 in the substantially vertical position, the interlock cam 172 with alignment of slot 174 to guide wall 170 allows translation of the arrangement 10 by movement of the carriage 114 along the rail 116. As seen in FIG. 11, the interlock cam 172 is mounted at the rear end of the shaft 150 with the guide wall 170 ending a predetermined distance short of the rear of the enclosure 12 so as to not interfere with the interlock cam 172 when the arrangement 10 is in the second position as shown in FIG. 10. Accordingly, the cam 172 is clear of the guide wall 170 in the second position and the shaft 150 may be rotated. However, if the arrangement 10 is pivoted between the second and third positions, translation of the arrangement 10 along the guide rail 116 is prevented by inteference of the cam 172 against the guide wall 170. For example, with the interlock cam 172 pivoted with the rotatable shaft 150 to the position shown in phantom as 172' in FIG. 11, the solid surface of the interlock cam 172 abuts the guide wall 170 if translation along guide rail 116 is attempted. Additionally, if pivoting of the arrangement 10 is attempted between the first and second positions, the guide wall 170 will be contacted by the cam 172 to prevent such attempted pivotal movement. As seen in FIG. 10, a roller bearing 176 is provided about the pin 152 and within the apertures of levers 146, 148.

As can be seen from FIGS. 1–11, the fuse mounting and handling arrangement 10 blocks access to the enclosure in the first, second and third positions. With the fuses in the second position, the front channel 136 as well as the front cover 160 block access. When the fuses are pivoted to the third position, the front cover blocks access. Additionally, with the fuses in the first position, the rear channel 132 blocks access as does the rear cover 158.

Referring specifically now to FIG. 9, the front channel member 136 and the front cover 160 are illustrated with the rotatable drive shaft 150 passing therethrough. The front drive levers 178 and 180 are similar to the rear drive levers 146 and 148. A clutch arrangement 185 is provided by a port or blocking plate 184 behind which is mounted a clutch plate 186. The clutch plate 186 is biased toward the port plate 184 by a coil spring 192 disposed about the drive shaft 150 and between the clutch plate 186 and a wall of the front cover 160. The spring 192 is mounted within a spacer 194. The clutch plate 186 includes a plurality of circumferentially spaced prongs 187 that extend toward the port plate 184. The port plate 184 includes ports 188 aligned with the prongs 187. The clutch plate 186 is fixedly carried by the shaft 150 and includes a central aperture having a predetermined cross section adapted to interfit with the shaft 150. In a specific embodiment, the cross section is hexagonal to interfit with the internal cross section of the tool 46 shown in FIG. 3, a portion of which is shown in FIG. 9. The port plate 184 is fixed to the front cover 160 and includes a central aperture 189 larger than the outer diameter of the tool 46. The central aperture 189 also includes two circumferentially spaced slots 191, one of which is shown in FIG. 9, that extend a predetermined radial distance beyond the central aperture 189. The slots 191 are relatively spaced to define a predetermined rotational angle of the shaft 150 that corresponds to positioning of the arrangement 10 from the substantially vertical, second position to the pivoted, third position. The slots 191 are arranged to allow a protuberance 190 on the tool 46 to pass through the port plate 184 when the tool 46 is properly, rotationally aligned with either of the slots 191. For example, with the fuses pivoted to the circuit-connected, third position, if the tool 46 is aligned with the appropriate indicia on the cover 160 indicating the closed position, the protuberance 190 is aligned with the slot 191 that corresponds to the closed position. Accordingly, the tool 46 passes through the port plate 184 and contacts and moves the clutch plate 186 to release the clutch plate 186 for rotation with the shaft 150; the shaft 150 being aligned with respect to the clutch arrangement 185 for interfitting of the tool 46 to drive the shaft 150. Assuming that the shaft 150 and clutch plate 186 are rotated to position the arrangement 10 from the third, circuit-connected position to the second, vertical position, the protuberance 190 will align with the spaced slot 191 that corresponds to the open position and the tool 46 can be removed with the clutch plate 186 via prongs 187 engaging the port plate 184. However, if the tool 46 is used to rotate the shaft 150 to a position which is not the second position, such as intermediate the second and third positions, the protuberance 190 will not align with either of the slots 191 and the tool 46 cannot be removed. This arrangement prevents operating personnel from inadvertently leaving the arrangement 10 between the positions two and three.

Considering now the support of the rail 116 by the enclosure 12 and referring now additionally to FIGS. 12-14, the rail 116 continues from the enclosure 12 along the door 30 by the provision of rail 196. The rails 116 and 196 correspond to rail 36 of FIG. 2. The rails 116 and 196 are articulated at hinge 37 by interfitting hinge portions of the two rails 116 and 196. A hinge pin 198 is positioned through aligned passages in the rails 116 and 196. The rail 196 is supported by the door 30 by means of the support mounting assembly 200.

In accordance with another aspect of the present invention and referring now to FIGS. 15, 16, 17 and 18, the arrangement 10 is provided with interlock features to prevent the pivoting of the fuses 14, 16 and 18 when the switch actuator 90 is in the closed position; thus permitting pivoting of the fuses only when the switch 90 is in the open position as indicated by switch blade 96. To this end and for achievement of this feature, an actuator cam 202 is arranged in fixed position with the switch actuator 90 to be rotated about an axis 204. The actuator cam 202 includes a predetermined arcuately shaped cam slot 205 which receives a locking pin 206 of a cable actuator assembly referred to generally at 208 in FIGS. 17 and 18. The position of the locking pin 206 shown in FIG. 15 corresponds to the switch 90 in the closed position.

Referring now to FIG. 16, a locking pin 206' cooperates with an interlock disk 209 fixedly carried on the shaft 150 at the far end of the shaft as shown in FIG. 10. FIG. 16 illustrates the position of the shaft 150 and the interlock disk 209 that corresponds to the fuses 14, 16 and 18 carried by the arrangement 10 being in the substantially vertical, second position. The locking pin 206' is included within a cable actuator assembly 208' identical to 208 with the two interlocks 208 and 208' being interconnected by a cable 210; the position of the cable controlling the position of the pin 206'. The positions of the locking pin 206 and 206' as shown in FIGS. 15 and 16, respectively, correspond to the switch closed position. In the position shown in FIG. 17, the pin 206' of 208' prevents rotation of the shaft 150 and thus prevents pivoting of the fuses from the second to third position. When the switch 90 is rotated to the open position, corresponding rotation of the actuator cam 202 moves the locking pin 206 to the upper position shown in phantom at 212. Accordingly, via the cable 210, the locking pin 206' is moved to the phantom position 212' (FIG. 15). With the locking pin 206' at the 212' (FIG. 16) position, the shaft 150 is capable of rotation without interferences by the locking pin 206' with the interlock disk 209. Thus the fuses may be pivoted from the second to the third, circuit-connected position. Similarly, if the fuses are in the third, circuit-connected position as indicated by the dashed phantom position 214 to the interlock disk 209 and when the switch 90 is in the open position, if the switch 90 is thereafter rotated to the closed position, the locking pins again assume the respective positions of 206 and 206'; the pin 206' preventing movement of the interlock disk 214 to prevent rotation of the shaft 150. Accordingly, the fuses may not be pivoted out of the closed circuit-conneected position until the switch 90 is opened.

Considering now an alternate embodiment of the carriage assembly 114 and referring to FIG. 19, the carriage assembly or suspension means 250 of FIG. 19 illustrates an additional specific embodiment to implement the pivotal movement of the carriage assemblies about an axis and translational movement in a direction parallel to the pivotal axis. In FIG. 19, the carriage assembly 250 cooperates with a rail 252 having a circular cross section with a pivotal axis 254. The rail 252 includes a support web 251 with openings 253 disposed in the second position for alignment with the carriage assembly 250. The openings 253 permit pivoting of the carriage assemblies 250 and the arrangement 10 to the third position. In this alternate embodiment, the cooperation between the openings 253 and the carriage assemblies 250 prevent pivoting of the fuse arrangement 10 between the first and second positions and also prevents translation of the fuse arrangement 10 at pivoted positions between the second and third position. In this alternate embodiment, the guide wall 170 and interlock cam 172 of FIG. 11 are deleted. Accordingly, if the arrangement 10 is in the second or third position, pivoting of the arrangement is not blocked while translation of the arrangement 10 is blocked. Further, if the arrangement 10 is between the first and second positions or in the first position, translation is permitted but pivoting is blocked.

Considering now the lower fuse mounting and handling arrangement 50 in more detail and referring to FIGS. 20 and 21, two or more carriage assemblies 216 (only one assembly is shown) similar to carriage 114 suspend the arrangement 50 for translation along a rail 218. A rotatably mounted shaft 220 is carried in a U-shaped frame of the carriage. Two drive levers 222 and 225 are fixedly carried at one end by the shaft 220 and the opposite ends thereof move within respective guide slot 224 of guide plate 223; the levers 222, 225 and the guide slot 224 cooperating as discussed in connected with the fuse arrangement 10 such that the end of levers 222, 225 are pinned at 226 to move within the guide slots 224. Counter clockwise rotation of the shaft 220 causes the pin end 226 of the levers 222, 225 to move from the lower position of the guide slot to the upper position as shown in FIG. 21. During this movement, the fuses are pivoted from a substantially vertical position to a pivoted position as shown in FIG. 21 so as to be inclined to the vertical for connection of fuse contact tongues 86, 88 to respective circuit connections not shown in FIG. 21, but as generally shown in FIG. 6 for the arrangement 10. The mounting arrangement 50 includes a frame generally referenced to at 228 that carries the fuses 52, 54 and 56 as well as the insulators, for example 78, 80, 82 and 82 and fuse mountings 81, 85 all as shown in FIG. 4. The frame 228 is rotatably mounted for example by a pivot pin 230 at the lower end of the frame 228 to allow pivoting of the bottom portion of the arrangement 50. The arrangement 50 also includes an outer frame referred to generally at 231 that supports the pivot pin 230. The inner frame 228 mounts and carries the fuses 52, 54 and 56 and pivots with respect to the outer frame 231. The enclosure 12 includes a support bracket 232 having a plurality of mounted rollers, for example 234, that cooperate with a guide channel rail 236 extending from the outer frame 231 for supporting the frame 231 as the outer frame 231 and the inner frame 228 translate along the rail 218. The rotatable shaft 220 in FIG. 21 is shown passing through a port plate 238 and a clutch plate 240 similar to the arrangement discussed in connection with the fuse handling arrangement 10.

While there has been illustrated and described various embodiment of the present invention, it will be apparent that various changes and modifications will occur to those skilled in the art. For example, the fuse arrangements 10 or 50 in alternate embodiments are arranged for pivoting about axes that are located other than near the top or bottom of their respective frames or carried articles. In one alternate arrangement, the fuse arrangement is pivoted near the center of the longitudinal axes of the fuses such that the top pivots rearward and the bottom pivots forward, for example counterclockwise about a point 300 in FIG. 6. Considering other changes and modifications, in one alternate embodiment, the fuses or other articles are pivotally mounted within a translatable mounting. The fuses are provided with fittings including pivot pins and the upper mounting corresponding to 66 of FIGS. 4 and 6 is replaced by a mounting to accept and pivotally mount the fuse. For example, a hinge and end fitting available from S&C Electric Company, Chicago, Ill., as the hinge of Catalog Number 5040 and a fuse end fitting, Catalog Number 3097. Accordingly, the pivotally-mounted fuses are translated in the fuse arrangement 10 from the first to the second position. In the second position, the fuses are pivoted about their mountings to the third position.

It is intended in the appended claims to cover all such changes and modifications as fall within the true spirit and scope of the present invention.

What is claimed and desired to be secured by Letters Patent of the United States is:

1. A mounting and handling arrangement used with an enclosure, the mounting and handling arrangement providing access to and replacement of electrical devices that are carried by the mounting and handling arrangement with said electrical devices in a first disconnected accessible position disconnected from an associated circiut and providing connection of said electrical devices to the associated circuit in a third connected inaccessible position, the mounting and handling arrangement comprising:

means for carrying said electrical devices; and
means carried by the enclosure for supporting said carrying means and said electrical devices and for positioning said electrical devices between said third connected inaccessible position and said first disconnected accessible position, said supporting and positioning means comprising means for providing translational movement of said carrying means along a predetermined direction between said first disconnected accessible position whereat said carrying means is outside the enclosure and a second position whereat said carrying means is within the enclosure, said supporting and positioning means further comprising means for providing pivotal movement of said carrying means with respect to a pivotal axis that is parallel to said predetermined direction, said pivotal movement providing means pivoting said carrying means between said second position and said third connected inaccessible position whereat said electrical devices are connected to the associated circuit.

2. The mounting and handling arrangement of claim 1 wherein said carrying means comprises a generally planar frame with said electrical devices being arranged within the plane of said frame.

3. The mounting and handling arrangement of claim 2 wherein said translational movement providing means comprises an elongated rail member and suspension means cooperating with said elongated rail member and disposed along one edge of said generally planar frame for suspending said generally planar frame.

4. The mounting and handling arrangement of claim 3 wherein said elongated rail member and said suspension means form a suspension system.

5. The mounting and handling arrangement of claim 3 wherein said pivotal movement providing means pivots said generally planar frame with respect to said elongated rail member and said suspension means.

6. The mounting and handling arrangement of claim 3 wherein said pivotal movement providing means pivots said generally planar frame about said pivotal axis which is closely spaced from and parallel to said elongated rail member.

7. The mounting and handling arrangement of claim 6 wherein said suspension means comprises means for engaging said elongated rail member and means for defining said pivotal axis.

8. The mounting and handling arrangement of claim 7 wherein said defining means comprises hinge means.

9. The mounting and handling arrangement of claim 1 wherein said axis and said predetermined direction are coincident.

10. The mounting and handling arrangement of claim 1 wherein said electrical devices each include connection arrangements and the associated circuit is defined in part by circuit connection arrangements arranged to cooperate and connect to respective electrical device connection arrangements, said carrying means comprising means for mounting said electrical devices in a predetermined position so as to align and connect said electrical device connection arrangements and said circuit connection arrangements in a predetermined manner when said carrying means is pivoted to said third position.

11. The mounting and handling arrangement of claim 1 wherein said electrical devices include contacts and said carrying means comprises means for mounting said electrical devices in insulated spaced relation and in a predetermined orientation and position, said carrying means further comprising conduction means for electrically contacting said electrical device contacts when said electrical devices are in said predetermined orientation and position.

12. The mounting and handling arrangement of claim 1 wherein said electrical devices each include two electrical contacts and said associated circuit includes a switch having a circuit connection member for each electrical device and having open and closed positions, the electrical devices in said third position each having one respective electrical contact connected to a respective circuit connection member.

13. The mounting and handling arrangement of claim 12 further comprising interlock control means responsive to the position of the switch for selectively inhibiting movement of said carrying means between said third and second positions when the switch is in the closed position.

14. The mounting and handling arrangement of claim 1 further comprising interlock control means responsive to a movable member of the associated circuit for inhibiting movement of said carrying means between said second and third positions when said movable member is in a predetermined position.

15. The mounting and handling arrangement of claim 1 further comprising means for preventing translational movement of said carrying means when said carrying means is between said second and third positions and also when said carrying means is in said third position.

16. The mounting and handling arrangement of claim 1 further comprising means for preventing rotational movement of said carrying means about said axis whenever said carrying means is between said first and second positions and also when said carrying means is in said first position.

17. The mounting and handling arrangement of claim 3 wherein a first edge of said planar frame is arranged along said pivotal axis and wherein said pivotal movement providing means pivots a second edge of said planar frame about said pivotal axis, said second edge being opposite said first edge.

18. The mounting and handling arrangement of claim 17 wherein said translational movement providing means further comprises means cooperating with the enclosure and said second edge of said planar frame for defining translational movement of said second edge of said planar frame along a direction parallel to said pivotal axis, said translational movement defining means comprising guide means carried by the enclosure.

19. The mounting and handling arrangement of claim 2 wherein said translating movement providing means comprises means for supporting said generally planar frame along a first edge of said generally planar frame, said pivotal movement providing means comprising means for pivoting said generally planar frame about a second edge of said generally planar frame opposite to said first edge.

20. The mounting and handling arrangement of claim 3 wherein the enclosure includes a door and wherein said mounting and handling arrangement further comprises a second rail member that is at least partially supported by the door and a hinge member for interconnecting said second rail member with said elongated rail member, said second rail member supporting said planar frame of said carrying means when said carrying means is translated to said first position.

21. The mounting and handling arrangement of claim 1 wherein said electrical devices are disconnected from the associated circuit in said second position.

22. The mounting and handling arrangement of claim 1 wherein said pivotal movement providing means comprises a rotatably mounted drive shaft and said mounting and handling arrangement further comprises a manually operable tool that interfits with said rotatably mounted drive shaft.

23. The mounting and handling arrangement of claim 22 wherein said manually operable tool includes first rotational orientation defining means and said pivotal movement providing means further comprises second rotational orientation defining means for defining said second and third positions in terms of corresponding rotational positions of said drive shaft, said second rotational orientation defining means being arranged to cooperate with said first rotational oreintation defining means.

24. The mounting and handling arrangement of claim 23 wherein said first rotational orientation defining means comprises a circumferential protuberance on said tool and said second rotational orientation defining means comprises a blocking plate having two slots circumferentially arranged with respect to said drive shaft.

25. The mounting and handling arrangement of claim 1 wherein the enclosure includes an opening and wherein said carrying means comprises a frame, said frame being translated into and out of the enclosure through the opening, said frame further comprising a first frame member for blocking access to the enclosure through the opening when said frame is in said first position.

26. The mounting and handling arrangement of claim 25 wherein said frame includes a second member for blocking access to the enclosure through the opening when said frame is in said second and third positions.

27. A mounting and handling arrangement for electrical devices each of which has at least two circuit connection arrangements, the mounting and handling arrangement comprising:
an enclosure having an access door;
means for mounting a plurality of said electrical devices in insulated spaced relation; and
means for positioning said mounting means between a third inaccessible position within said enclosure in which said electrical devices are connected in circuit connection and a first accessible position in which said electrical devices are disconnected from circuit connection and disposed outside said enclosure with said access door in an open position, said positioning means comprising means for rotating said mounting means about a predetermined axis between said third position and a second position, said positioning means further comprising means for translating said mounting means along a direction parallel to said axis between said second position and said first position.

28. A method to provide access to a planar array of electrical devices which are normally in an inaccessible circuit-connected position comprising the steps of:
pivoting the planar array of electrical devices about a predetermined axis from said circuit-connected position to an intermediate position; and
translating the planar array of electrical devices along a direction parallel to said predetermined axis from said intermediate position to an accessible position.

29. An arrangement which permits a planar array of articles to be inaccessibly located in back of a wall in an inaccessible position or accessibly located in front of the wall in an accessible position, the wall having an opening through which said planar array of articles can be moved between the inaccessible and accessible positions, the arrangement comprising:
means for pivoting said planar array of articles about an axis from said inaccessible position to an intermediate position; and
means for translating said planar array of articles along a direction parallel to said axis from said intermediate position to said accessible position.

30. An arrangement as recited in claim 29 further comprising means for carrying said articles, said carrying means comprising means for blocking said wall opening in said accessible and inaccessible positions.

31. An arrangement as recited in claim 29 further comprising means for mounting said articles, said mounting means comprising a frame having end panels for blocking said wall opening in said accessible and inaccessible positions.

32. A mounting and handling arrangement for electrical devices having at least two circuit contacts, the mounting and handling arrangement being used with an enclosure to provide access to the electrical devices in a position diconnected from an associated circuit and to provide connection of the electrical devices to the associated circuit in an inaccessible position, the mounting and handling arrangement comprising:

an enclosure;

first means for carrying a first plurality of electrical devices in a predetermined orientation;

second means for carrying a second plurality of electrical devices in a predetermined orientation; and means carried by said enclosure for supporting said first and second carrying means and for positioning said first plurality and said second plurality of electrical devices between respective connected inaccessible positions and respective disconnected accessible positions, said supporting and positioning means comprising means for providing translational movement of said first carrying means and said second carrying means along respective predetermined directions and between respective first accessible positions whereat the first and second plurality of electrical devices are outside said enclosure and respective second positions whereat said first and second plurality of electrical devices are within said enclosure, the first and second plurality of electrical devices also being moveable to respective third inaccessible positions whereat the first plurality and second plurality of electrical devices are connected to the associated circuit, said supporting and positioning means further comprising means for providing pivotal movement of said first plurality and said second plurality of electrical devices with respect to respective axes parallel to said respective predetermined directions and between said respective second positions and said respective third inaccessible positions.

33. The mounting and handling arrangement of claim 32 wherein said respective predetermined directions are parallel to each other.

34. The mounting and handling arrangement of claim 33 wherein said first and second carrying means each comprise respective first and second generally planar frames, said first generally planar frame being pivoted about a first edge of said first generally planar frame along which said first generally planar frame is supported, said second generally planar frame being supported along a first edge of said second generally planar frame, said second generally planar frame being pivoted about a second edge of said second generally planar frame opposite to said first edge of said second generally planar frame.

35. A mounting for an article which permits a planar array of articles to be accessibly located in front of a wall in a first position and inaccessibly located in back of said wall in a second position, said wall having an opening through which the articles can be moved between the first and second positions, the mounting comprising:

an enclosure that defines said wall;

a first frame for carrying said planar array of article;

a rail carried by said enclosure;

means cooperating with said rail for suspending said first frame, said suspending means comprising one or more carriages being slidable along said rail;

a second frame movable with said first frame; and drive means carried by said second frame, said drive means comprising at least two drive levers and a rotatable drive shaft disposed substantially parallel to said rail, said drive levers being fixedly connected at one end to said drive shaft and being slidably mounted with respect to said first frame, a rotation of said drive shaft causing pivoting movement of said first frame about a first edge of said first frame that is aligned along said rail, said first frame being translated from said first position outside said enclosure and in front of said wall to said second position inside said enclosure and in back of said wall, said first frame being pivoted from said second position to a third position, said articles being accessibly locatd in said first position and inaccessibly located in said third position.

* * * * *

UNITED STATES PATENT AND TRADEMARK OFFICE
CERTIFICATE OF CORRECTION

PATENT NO. : 4,777,559
DATED : Oct. 11, 1988
INVENTOR(S) : Chester Bar et al

Page 1 of 2

It is certified that error appears in the above-identified patent and that said Letters Patent is hereby corrected as shown below:

Col. 2, line 21, "handing" should be -- handling --;
      line 31, "rogers" should be -- Rogers -- (first letter caps);
Col. 3, line 18, add a comma -- , -- between "desirable" and "novel";
      line 65, after "invention" insert a comma -- , --;
Col. 5, line 35, "removable" should be -- removal --;
Col. 6, line 23, "assay" should be -- array --;
      line 58, "arrangement" should be -- arrangements --;
Col. 7, line 43, "closedcircuit" should be -- closed circuit --;
Col. 8, line 5, after "Accordingly" insert a comma -- , --;
      line 8, after "Conversely" insert a comma -- , --;
      line 17, "form" should be -- from --;
      line 47, "with" should be -- within --;
      line 58, after "Similarly" insert a comma -- , --;
Col. 9, line 5, after "146" insert -- in FIG. 6 --;
Col. 11, line 19, "37" should be -- 38 --;
      line 59, after "212" insert -- FIG. 15 --;
      line 61, "15" should be -- 16 --;
      line 61, delete "(FIG. 16)";
      line 67, "to" should be -- of --;
Col. 12, line 45, "connected" should be -- connection --;
      line 48, "Counter clockwise" should be -- Counterclockwise --;
      line 58, "referenced" should be -- referred --;
      line 60, "82 and 82" should be -- 82 and 84 --;
Col. 13, line 4, before "frame" (first occurrence) insert -- outer --;
      line 11, "embodiment" should be -- embodiments --;
      line 31, "pivotally-mounted" should be -- pivotally mounted --;
Claim 12, col. 14, line 62, "the" should be -- said --;
Claim 32, col. 17, line 10, "diconnected" should be -- disconnected --;
      line 34, "moveable" should be -- movable --;
Claim 35, col. 18, line 24, "article" should be -- articles --;
      line 44, "locatd" should be -- located --.

UNITED STATES PATENT AND TRADEMARK OFFICE
CERTIFICATE OF CORRECTION

PATENT NO. : 4,777,559

DATED : Oct. 11, 1988

INVENTOR(S) : Chester Bar et al

It is certified that error appears in the above-identified patent and that said Letters Patent is hereby corrected as shown below:

Col. 7, line 42, "the" should read --The--.

Signed and Sealed this

Tenth Day of August, 1993

Attest:

MICHAEL K. KIRK

Attesting Officer     Acting Commissioner of Patents and Trademarks